United States Patent [19]

Yamamoto

[11] Patent Number: 4,667,980
[45] Date of Patent: May 26, 1987

[54] SEAT BELT APPARATUS OF A VEHICLE
[75] Inventor: Kazuo Yamamoto, Fujisawa, Japan
[73] Assignee: NSK-Warner K. K., Tokyo, Japan
[21] Appl. No.: 703,675
[22] Filed: Feb. 20, 1985
[30] Foreign Application Priority Data Feb. 21, 1984 [JP] Japan .............................. 59-22416[U]

[51] Int. Cl.$^4$ ............................................. B60R 21/10
[52] U.S. Cl. .................................... 280/801; 297/483; 280/808
[58] Field of Search ......................... 280/801, 805, 808; 297/481, 483

[56] References Cited

U.S. PATENT DOCUMENTS

| | | | |
|---|---|---|---|
| 3,907,329 | 9/1975 | Erion et al. | 280/150 |
| 4,175,633 | 11/1979 | Andres et al. | 180/270 |
| 4,244,601 | 1/1981 | Nilsson | 280/805 |
| 4,323,278 | 4/1982 | Sukipp et al. | 297/481 |
| 4,457,538 | 7/1984 | Watanabe et al. | 280/801 |
| 4,482,188 | 11/1984 | Tilly et al. | 280/801 |
| 4,496,170 | 1/1985 | Sasaki et al. | 280/801 |
| 4,531,762 | 7/1985 | Sasaki et al. | 280/801 |

FOREIGN PATENT DOCUMENTS

| | | |
|---|---|---|
| 93028 | 12/1973 | Japan . |
| 204961 | 12/1982 | Japan . |
| 53545 | 3/1983 | Japan . |
| 53546 | 3/1983 | Japan . |
| 48551 | 4/1984 | Japan . |

Primary Examiner—Richard A. Bertsch
Attorney, Agent, or Firm—Shapiro and Shapiro

[57] ABSTRACT

A three-point type seat belt apparatus is characterized in that the free end side of webbing is supported for movement in the longitudinal direction of a vehicle and the free end side of the webbing is driven in response to the tilting movement of the seat back of a seat.

9 Claims, 12 Drawing Figures

SEAT BELT APPARATUS OF A VEHICLE

BACKGROUND OF THE INVENTION

1. Field of the Invention

This invention relates to improvements in a three-point type seat belt apparatus.

2. Description of the Prior Art

In a three-point type seat belt, webbing is disposed inside the rear of the door of a vehicle, and one end of the webbing is connected to a retractor disposed below one side of the vehicle and the other end thereof is turned back through a through-ring disposed above said one side of the vehicle and is made to depend downwardly and secured through an anchor disposed below said one side. When the webbing is not worn, it is held vertically inside the rear of the door, and when the webbing is worn, the seat occupant stretches his arm rearwardly and grips a suitable portion of the webbing or a tang plate to draw out the webbing forwardly and inwardly and bring the tang plate into engagement with a restraining device such as a buckle disposed at the center of the vehicle component, whereby the webbing is worn by the waist and shoulder of the seat occupant.

In the three-point type seat belt apparatus described above, the webbing is positioned rearwardly and sideways of the seat and there is a distance between the seat occupant, i.e. the seat, and the webbing and therefore, when the seat occupant wants to wear the webbing, he must twist his body and stretch his arm to grip the webbing or the tang plate, and this is inconvenient to the belt wearing operation. Particularly, where the door is large as in the case of a two-door vehicle, the pillar portion rearward of the door behind which the webbing is vertically provided is spaced apart rearwardly of the seat and thus, the distance between the seat and the webbing is great, and this is particularly inconvenient to the belt wearing operation.

To eliminate such disadvantages, various contrivances have heretofore been made. For example, it has been the practice to make the anchor movable longitudinally of the vehicle in a rail fixedly disposed on the floor sideways of the seat, and move the anchor forwardly through a runner or the like when the seat occupant wears the webbing, and move the anchor rearwardly when the seat occupant does not wear the webbing.

According to this practice, however, when the position of the seat has been moved and adjusted longitudinally of the vehicle for a reason such as the difference in constitution between seat occupants (particularly, when the position of the seat has been moved forwardly), even if the anchor is moved forwardly on purpose, the distance between the seat occupant and the webbing will become greater. This is because the guide rail is fixed to the floor.

SUMMARY OF THE INVENTION

The present invention has been made with a view to eliminate the disadvantages peculiar to the prior art, that is, to provide a three-point type seat belt apparatus improved so that the distance between the seat occupant and the webbing may not become greater even if the seat is moved forwardly in response to the forward tilting of the seat back.

In the three-point type seat belt apparatus of the present invention, the free end of the webbing is connected to support means supported by the seat and the free end of the webbing connected to this support means is movable longitudinally of the vehicle and therefore, even if the position of the front seat is changed, the relative position of this seat and the webbing does not fluctuate and thus, the seat occupant can easily wear the webbing and also, the seat occupant on the back seat can smoothly get on and off the vehicle.

BRIEF DESCRIPTION OF THE DRAWINGS

FIG. 1 being a front view of the entire embodiment,

FIG. 2 being an enlarged front view of the essential portions, FIG. 3 being a cross-sectional view taken along line III—III in FIG. 2, FIG. 4 being a cross-sectional view taken along line IV—IV in FIG. 2, FIG. 5 being an enlarged front view of the essential portions in FIG. 1, FIG. 6 being a plan view of the essential portions in FIG. 1, and FIGS. 7, 8 and 9 being front views for illustrating the operation of the first embodiment.

FIG. 10 being an enlarged front view of the essential portions corresponding to FIG. 2, and FIG. 11 being a cross-sectional view taken along line XI—XI in FIG. 10.

DESCRIPTION OF THE PREFERRED EMBODIMENTS

Some embodiments of the present invention will hereinafter be described with reference to the drawings, but, the present invention can of course be suitably changed without departing from the gist thereof.

Figure 1:
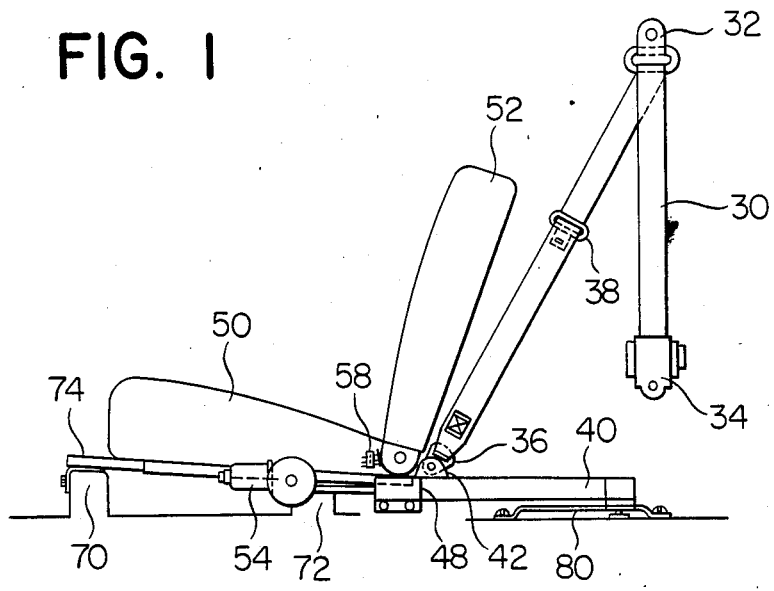
FIGS. 1 to 9 show a first embodiment of the present invention.
Figure 2:
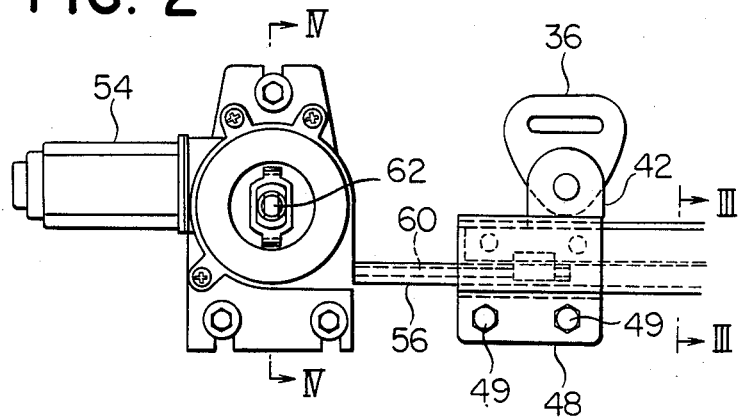

As shown in FIGS. 1 and 2, webbing 30 has its intermediate portion turned back at a through-ring 32 serving as a guide member, and one end thereof is adapted to be taken up by or drawn out from a retractor 34 and the other end thereof has an anchor 36 attached thereto. A tang 38 is mounted for movement on the portion of the webbing 30 between the through-ring 32 and the anchor 36.

Figure 3:
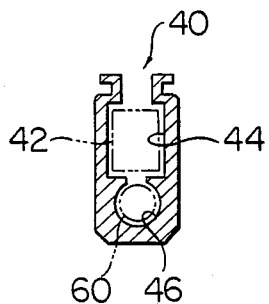

The anchor 36 is connected to a runner 42 which is movable on a guide rail 40. The, the guide rail 40 has a groove 44 of rectangular cross-section in the upper portion thereof and a groove 46 of circular cross-section in the lower portion thereof, as shown in FIG. 3, and extends longitudinally of the vehicle body, and the runner 42 is movably contained in the upper groove 44. The fore end of the guide rail 40 is fixed to one side of a front seat 50 by an anchor bracket 48 and bolts 49. The anchor 36, the guide rail 40 and the runner 42 together constitute support means. A motor 54 is disposed forwardly of the anchor bracket 48 and sideways of the seat 50, and a guide tube 56 is interposed between the two. The operation of the motor 54 is controlled by a switch 58 adapted to be operated when the seat back of the seat 50 is brought to its forwardly inclined position or its upright position.

Figure 4:
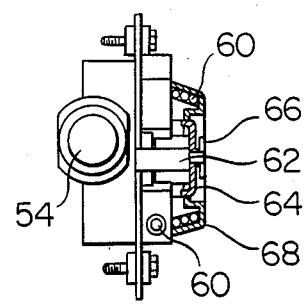

A wire 60 is inserted in the guide tube 56, and one end thereof is connected to the runner 42, while the other end thereof is connected to the output shaft 62 of the motor 54. As, as shown in FIG. 4, a wire take-up drum 68 is secured to the output shaft 62 of the motor 54 by a lock plate 64 and a nut 66, and the wire 60 is taken up by or paid out from the drum 68, and along therewith, drives the runner 42 back and fourth on the guide rail 40. The, the motor 54 and the wire 60 together constitute a driving mechanism.

Figure 5:
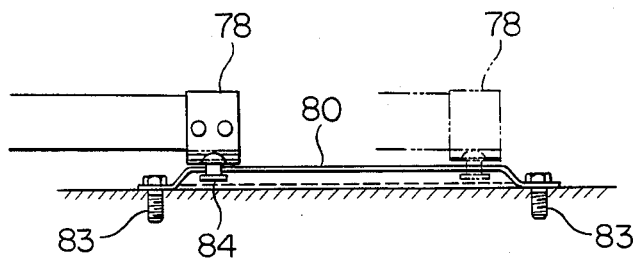
Figure 6:
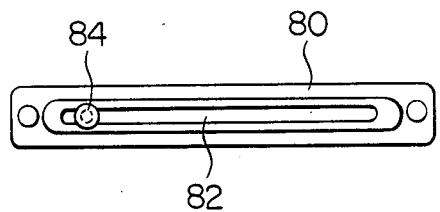

The seat 50 is movable longitudinally of the vehicle while being guided by a rail 74 passed over blocks 70 and 72. Also, the rear end portion of the guide rail 40 which is made integral with the seat 50 is made movable on a slide base 80 by a bracket 78, as shown in FIGS. 5 and 6. The, the slide base 80 provided with a guide slot 82 is fixed to the floor by bolts 83, and a slide pin 84 studded on the bracket 78 is fitted in the guide slot 82.

Operation of the present embodiment will now be described.

FIG. 1 shows the positions of various members when the seat occupant wears the seat belt. The seat 50 is in its rearward position on the rail 74. The anchor 36, as well as, the runner 42, on the free end side of the webbing 30, is in its forward position in the guide rail 40. This is because the seat back 52 is in its upright position and the drum 68 of the motor 54 his rotated in a forward direction to take up the wire 60. In this state, the tang 38 on the webbing 30 is proximate to the seat 50 and therefore, the seat occupant can easily grip the tang 38 and can wear the webbing 30 by bringing the tang 38 into engagement with a buckle (not shown).

Figure 7:
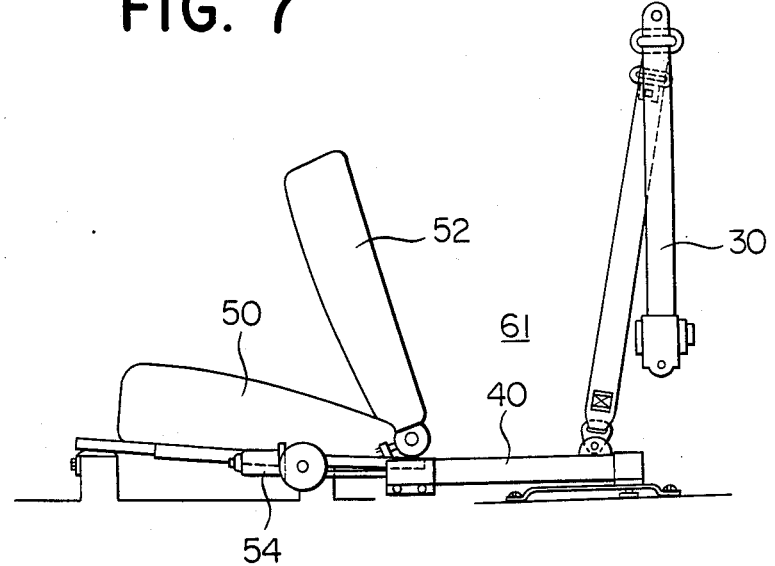

Also, when the seat occupant seated on the seat 50 gets off the vehicle, by first disengaging the tang 38 from the buckle, if he then brings down the seat back 52 forwardly, the switch 58 will be closed and the motor 54 will revolve in a reverse direction and thus, the wire 60 will be paid away from the drum 68. As a result, the runner 42 will be moved rearwardly on the guide rail 40 and the webbing 30 will assume a state shown in FIG. 7. In this state, a large space 61 is secured between the seat back 52 and the webbing 30 and therefore, a seat occupant seated on the back seat (not shown) can easily get off the vehicle through this large space.

Figure 8:
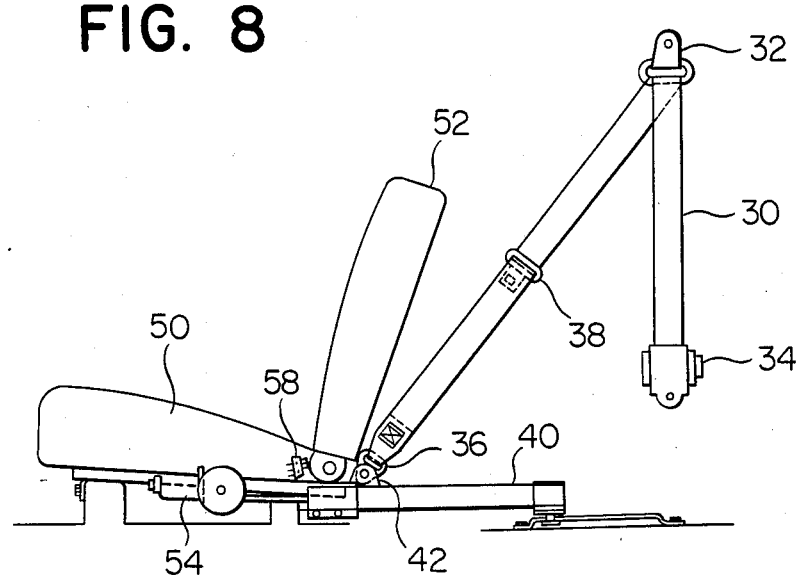
Figure 9:
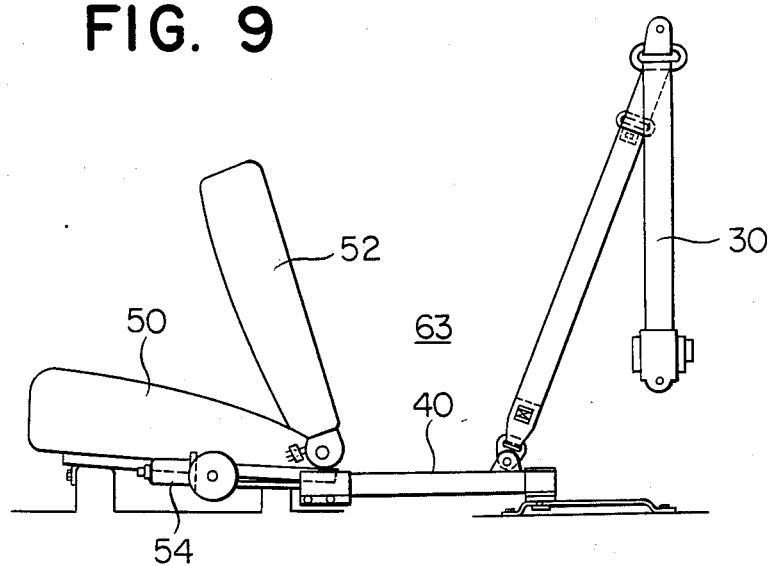

A case where the position of the seat 50 has been changed forwardly due to the difference in constitution between seat occupants seated on the seat 50 will now be described with reference to FIGS. 8 and 9. In such case, the movement of the runner 42 driven by the motor 54 operated on the basis of the tilting of the seat back 52 and the disengagement between the tang 38 and the buckle are the same as what has been described above. But the relative position of the seat 50 and the guide rail 40 should noted here. That is, as is apparent from FIG. 9, even when the seat 50 is moved forwardly, the guide rail 40 is moved forwardly therewith and the relative position of these two does not change at all and therefore, when the runner 42 has come to its forward position, the webbing 30 is positioned immediately rearwardly of the seat 50 as shown in FIG. 8. Accordingly, the seat occupant seated on the forwardly moved seat 50, like the seat occupant seated on the seat 50 which is in its rearward position, can easily grip the tang 38 and wear the webbing 30. In a state in which the webbing 30 has been moved rearwardly (see FIG. 9), a wide space 63 can be secured between the webbing 30 and the back seat as in the previously described case (see FIG. 7), and this is apparent from the fact that the seat 50 has been moved forwardly.

Another embodiment of the present invention will now be described with reference to FIGS. 10 and 11. This embodiment differs from previous embodiment in the method of driving the runner. More particularly, a gear 102 is mounted at the lower end of the seat back 52 for rotation about a pivot 104, and this gear 102 is in mesh engagement with the gear 112 of a wire driving mechanism 110. The, the gear 112 is fixed to a shaft 116 supported by a case 114 secured to one side of the seat 50, and a wire take-up drum 122 is fixed to the shaft 116 by a lock plate 118 and a nut 120. A wire tube 124 is curvedly disposed between the case 114 and the anchor bracket 48, and a wire 60 is inserted in the wire tube 124. The wire 60 and the wire driving mechanism 110 together constitute a runner driving mechanism.

Figure 10:
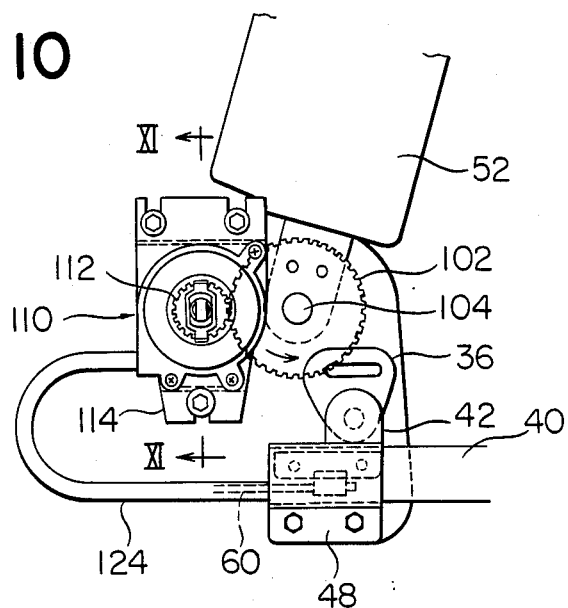
FIGS. 10 and 11 show a second embodiment of the present invention.
Figure 11:
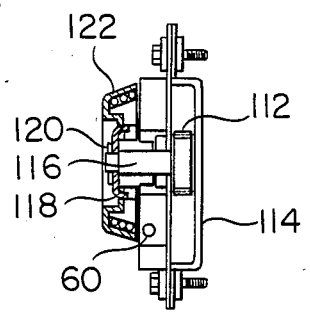

In the present embodiment, when the seat back 52 is brought down forwardly after the seat occupant gets off the vehicle, the gear 102 rotates counter-clockwise (as viewed in FIG. 10) and the gear 112, which is in mesh engagement therewith, and the shaft 116 rotate clockwise (as viewed in FIG. 10). As a result, the drum 122 is rotated in the same direction as the shaft 116 and pays out the wire 60, whereby the runner 42 is moved rearwardly on the guide rail 60. Conversely, when the seat occupant returns the seat back 52 to its upright position before he gets on the vehicle, the various members are moved in the opposite direction and the wire 60 is taken up by the drum 122 and therefore, the runner 42 moves forwardly.

Figure 12:
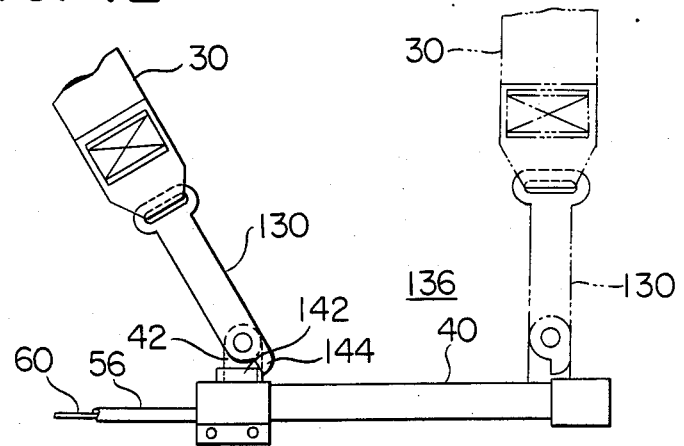
FIG. 12 is an enlarged view of the essential portions of a third embodiment of the present invention.

FIG. 12 shows still another embodiment of the present invention. A feature of this embodiment is that when the runner 42, as well as free end side of the webbing 30, has moved forwardly, an anchor plate 130 pivots. A, a guide block 142 is projected forwardly of the guide rail 40, while the elongated anchor plate 130 pivotally mounted on the runner 42 has a protrusion 144 engageable with the guide block 142, on that end of the anchor plate which is opposed to the end on which it is connected to the webbing 30. When the runner 42 has moved forwardly on the guide rail 40 as indicated by the solid lines, the protrusion 144 comes into engagement with the guide block 142 and the anchor plate 130 is pivoted counter-clockwise. Since the anchor plate 130 is elongated, the pivotal movement thereof causes the free end side of the webbing 30 to approach the seat occupant. The anchor plate 130 is in its upright position as indicated by dots-and-dash lines when the runner 42 is in its rearward position, and a large space 136 is secured between it and the seat.

Besides the above-described embodiments, an embodiment in which the cross-sectional shape of the guide rail 40 for guiding the runner 42 is changed, an embodiment in which the fore end portion of the guide rail 40 is fixed to the seat 50 and an embodiment in which the rear end portion of the guide rail 40 is placed for movement relative to the floor can be adopted as required. Also, the elongated anchor plate 130 as shown in FIG. 12 may be pivotally connected directly to the seat 50 and this anchor plate may be designed to be pivoted by a wire or the like.

I claim:

1. A three-point type seat belt apparatus for use with a seat movable longitudinally of a vehicle body and having a tiltable seat back, comprising:

a retractor secured to one side of the vehicle body and capable of taking up or paying out a webbing;

a guide member secured to an upper portion of said one side of the vehicle body, said guide member downwardly turning back the webbing paid out upwardly from the retractor and guiding the webbing;

anchor means provided at a free end of the webbing;

guide means secured to the seat to move together therewith, said guide means extending longitudinally of the vehicle body to guide said anchor means therealong, a front end of said guide means forming an anchoring position for said anchor means when the webbing is in a passenger restraining state; and a driving mechanism connected to said anchor means to move said anchor means to a front end or a rear end of said guide means in response to tilting of the seat back, the driving mechanism operating to move said anchor means to the front end of the guide means when the seat back is brought into an upright position and to move it to the rear end of the guide means when the seat back is brought into a forwardly tilted position.

2. A seat belt apparatus according to claim 1, wherein said driving mechanism comprises a motor fixed to the seat, a drum rotated by the motor, and a wire taken up by or paid out from the drum and connected to said anchor means.

3. A seat belt apparatus according to claim 2, said driving mechanism further including a switch controlling a circuit to rotate the motor in a first direction when the seat back is brought into the upright position and rotate it in a second direction inverse to the first direction when the seat back is brought into the forwardly tilted position.

4. A seat belt apparatus according to claim 1, wherein said driving mechanism comprises a drum rotatably disposed near the seat, movement converting means for converting the tilting movement of the seat back of the seat into rotation of the drum, and a wire taken up by or paid out from the drum and connected to said anchor means.

5. A seat belt apparatus according to claim 4, wherein said movement converting means includes a first gear secured to the seat back and a second gear rotatable with the drum and meshing with the first gear.

6. A three-point type seat belt apparatus of a vehicle having a seat movable longitudinally of a vehicle body and provided with a tiltable seat back, comprising:

a retractor secured to one side of the vehicle body and capable of taking up or paying out a webbing;

a guide member secured to an upper portion of said one side of the vehicle body, said guide member downwardly turning back the webbing paid out upwardly from the retractor and guiding the webbing;

anchor means including an anchor plate provided with a protrusion at one end and connected at an opposite end with a free end of the webbing, and a runner supporting the anchor plate pivotally at said one end;

guide means secured to the seat to move together therewith, said guide means extending longitudinally of the vehicle body to guide said anchor means therealong, a front end of said guide means forming an anchoring position for said anchor means when the webbing is in a passenger restraining state; and a guide block provided adjacent to the front end of said guide means, the guide block engaging with the protrusion of the anchor plate when said anchor means has been guided to the front end of said guide means to thereby tilt the anchor plate forwardly.

7. A three-point type seat belt apparatus of a vehicle having a seat movable longitudinally of a vehicle body and provided with a tiltable seat back, comprising:

a retractor secured to one side of the vehicle body and capable of taking up or paying out a webbing;

a guide member secured to an upper portion of said one side of the vehicle body, said guide member downwardly turning back the webbing paid out upwardly from the retractor and guiding the webbing;

anchor means provided at a free end of the webbing;

guide means secured to the seat to move together therewith, said guide means extending longitudinally of the vehicle body to guide said anchor means therealong, a front end of said guide means forming an anchoring position of said anchor means when the webbing is in a passenger restraining state;

a bracket secured to a rear end portion of said guide means; and a base secured to the vehicle body and extending longitudinally thereof, the base having means for supporting and guiding the bracket thereby.

8. A seat belt apparatus of a vehicle according to claim 7, wherein a slide pin is secured to said bracket, said supporting and guiding means being a guide slot for guiding the slide pin.

9. A seat belt apparatus of a vehicle according to claim 8, wherein said slide pin extends downwardly through said guide slot and has a tip at its lower end that is larger in width than the width of the guide slot.

* * * * *